United States Patent [19]
Kawada et al.

[11] 3,741,474
[45] June 26, 1973

[54] AUTOPILOT SYSTEM
[75] Inventors: Shin-Ichi Kawada, Yokohama; Yoichi Hirokawa, Kamakura; Isao Masuzawa, Tokyo, all of Japan
[73] Assignee: Kabushikikaisha Tokyo Keiki (Tokyo Keiki Co., Ltd.), Tokyo, Japan
[22] Filed: Feb. 18, 1971
[21] Appl. No.: 116,516

[30] Foreign Application Priority Data
 Feb. 24, 1970 Japan.................................. 45/65668

[52] U.S. Cl............ 235/150.1, 318/588, 235/150.2
[51] Int. Cl. .......................................... G05b 11/42
[58] Field of Search.................... 235/150.2, 150.27, 235/150.26, 150.1; 318/588, 610; 114/144

[56] References Cited
UNITED STATES PATENTS
3,133,520 5/1964 Bentkowsky et al............ 318/588 X
3,614,633 10/1971 Yalyshev et al. ............... 318/610 X
2,946,943 7/1960 Nye et al. ....................... 318/610 X
3,227,935 1/1966 Kawada .............................. 318/610

Primary Examiner—Eugene G. Botz
Attorney—Hill, Sherman, Meroni, Gross & Simpson

[57] ABSTRACT
A marine autopilot system in which derivative, proportional, filtering and integral functions are performed including a device for changing the time constant of an integrator and either or both of the time constants for the differentiator and the filters such that the automatic steering loop remains so as to control a ship safely.

5 Claims, 7 Drawing Figures

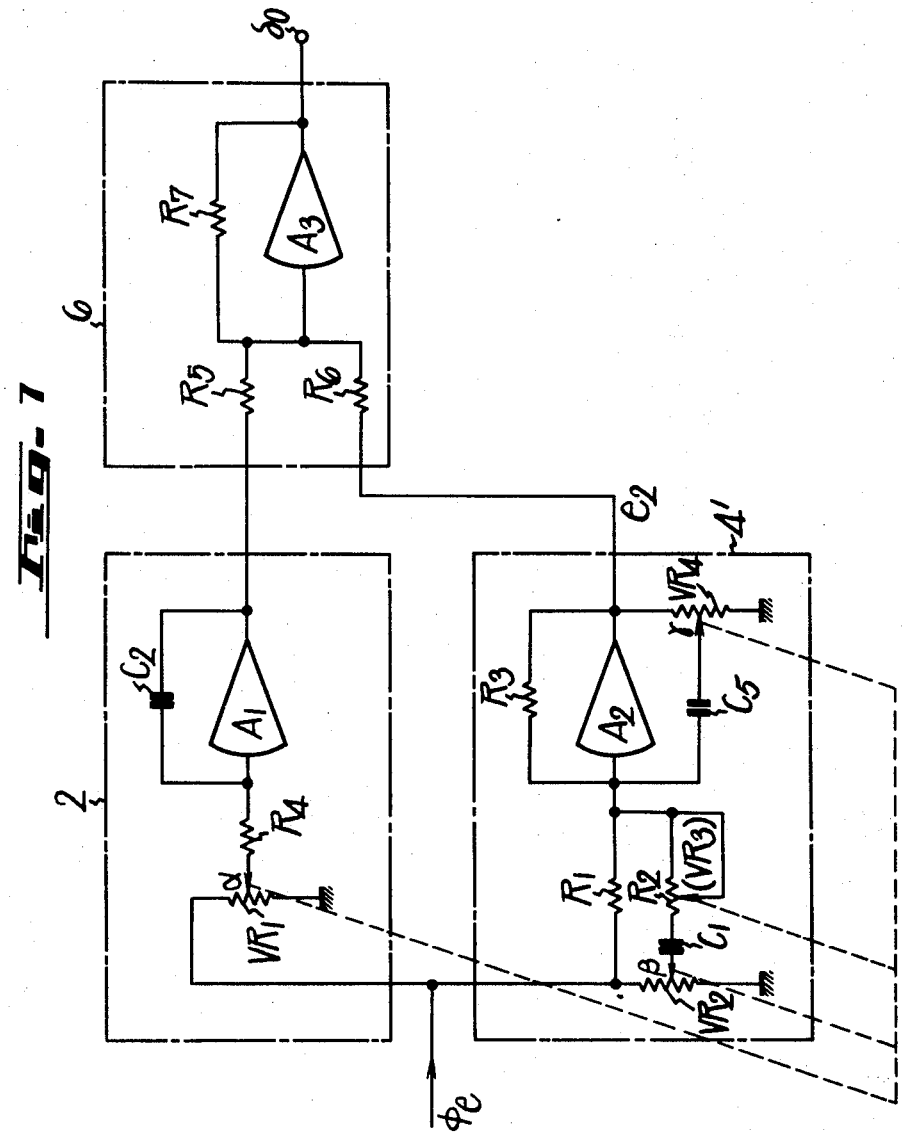

3,741,474

AUTOPILOT SYSTEM

BACKGROUND OF THE INVENTION

1. Field of the Invention

This invention relates to a marine automatic steering system, and more particularly to a marine autopilot system which prevents loss of control of a ship or unstability of the ship's heading or the like.

2. Description of the Prior Art

In the automatic control field, marine autopilot systems have long been used. Almost of all the autopilot systems now in use for giant ships perform derivative and proportional control actions.

Along with recent innovation of navigation techniques and improvements in navigation instruments, an autopilot system has been proposed which is capable of performing an integral control action in response to steady disturbances in addition to the aforementioned derivative and proportional control actions. Such complex autopilot systems require a high degree of technical understanding of the system to adjust the control actions. Easy adjustment of the control action is an indispensable condition for popular use of such an autopilot system. In addition, the autopilot system must be designed so that it will not become unstable even if an operator incorrectly controls it because otherwise a dangerous situation would result.

Even for an expert, it takes a long time to set an optimum point for high performance operation control, i.e., systems having derivative, integral and proportional controls such as above mentioned, by separately adjusting each control element. There is also the possibility that these adjustments will make the control loop unstable and render the ship's course unsteady unless an experienced and highly qualified operator makes the adjustments to the system.

SUMMARY OF THE INVENTION

Accordingly, the primary object of this invention is to provide a marine autopilot system which is free from the aforementioned defects encountered in the prior art and may be easily adjusted to obtain high performance and safe control of the system.

BRIEF DESCRIPTION OF THE DRAWINGS

FIGS. 5-7, inclusive, are schematic diagrams showing examples of a marine autopilot system of this invention.

DESCRIPTION OF THE PREFERRED EMBODIMENTS

Figure 1:
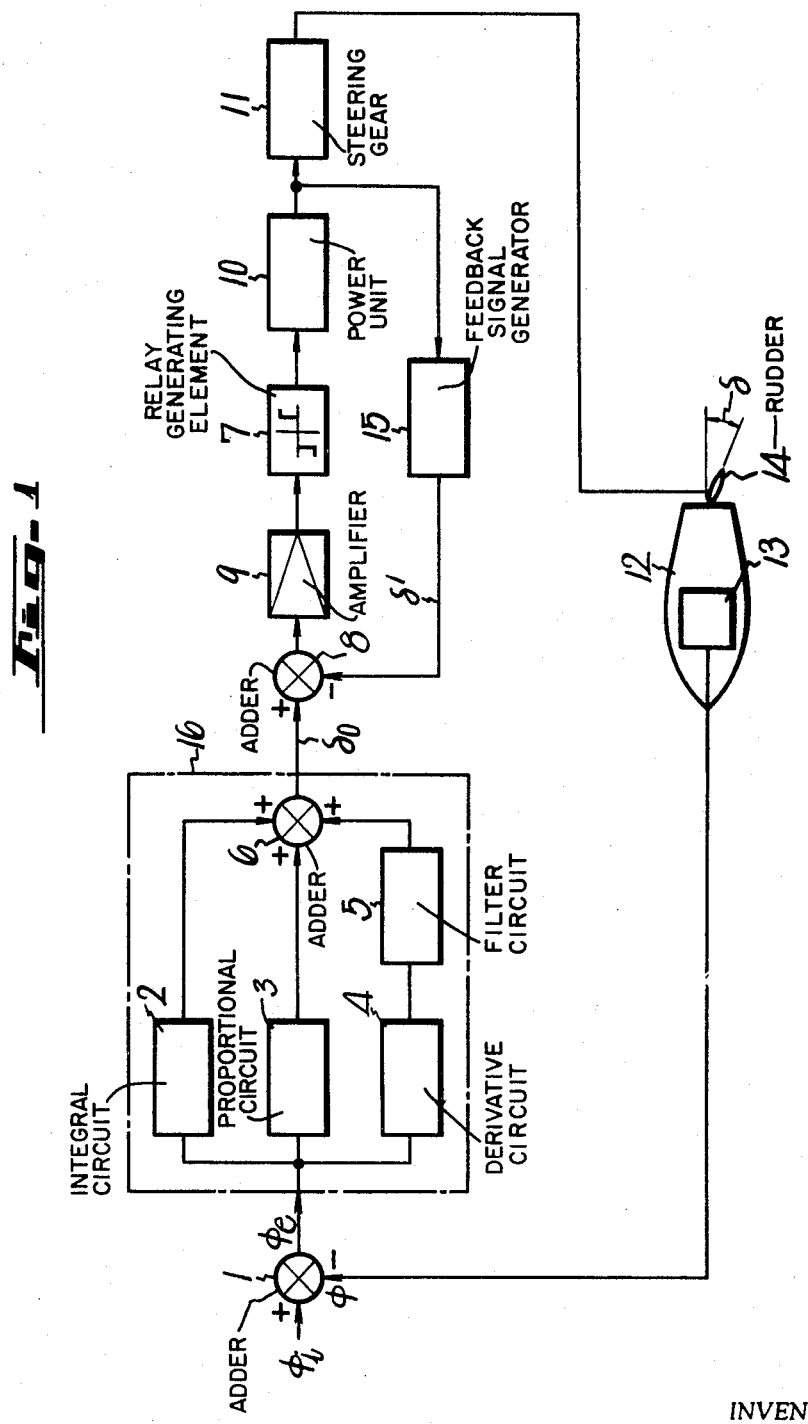
FIG. 1 is a block diagram of an automatic control loop, for explaining a known pilot system.

For a better understanding of the present invention, a description will be given first of a conventional autopilot system in connection with FIG. 1. A heading signal $\phi$ from a compass mounted on a vehicle 12 such as a ship which is to be controlled is supplied to an adder 1. A set course signal $\phi i$ is also fed to the adder 1 and the signals $\phi$ and $\phi i$ are compared. In the event there is deviation between the heading signal $\phi$ and the set course signal $\phi i$, the adder 1 converts the deviation into an error signal $\phi e$. The error signal $\phi e$ derived from the adder 1 is supplied to an operational mechanism or unit 16 including an integral circuit 2, a proportional circuit 3, a derivative circuit 4 and a filter circuit 5 connected as shown. The error signal $\phi e$ is supplied to the inputs of circuits 2, 3 and 4. The output of circuit 4 is supplied to circuit 5. The outputs of the integral circuit 2, the proportional circuit 3 and the filter circuit 5 are added together in an adder 6.

As is well-known, the autopilot obtains from the derivative circuit 4 a rate signal proportional to the turning speed of the vehicle which is used with the signal $\phi e$ proportional to the deviation of her course to stabilize the control loop including the vehicle. Further, the autopilot employs an integral circuit in the operational unit for controlling the rudder angle to keep the heading of the vehicle so as to maintain the set course $\phi i$ when steady disturbances such as wind, tide and the like exist or the vehicle has an unsymmetrical peculiarity. These signals derived from the operational circuits are combined together by the adder 6. The signal $\delta_0$ at the output of the adder 6 is supplied to drive a power unit 10 through an adder 8, an amplifier 9 and a relay operating element 7. The power unit 10 controls a rudder 14 of the vehicle 12 through a steering gear 11. A feedback signal generator 15 is controlled by the power unit 10 and provides a signal which is proportional to the rudder angle. The output signal $\delta'$ of the feedback signal generator 15 is supplied to the adder 8. The signals $\delta_0$ and $\delta'$ are compared in adder 8 and a difference signal is fed back to the input of the amplifier 9. That is, the rudder 14 is faithfully controlled to correspond to the signal $\delta_0$ by a minor control loop made up of the adder 8, the amplifier 9, the relay operating element 7, the power unit 10 and the feedback signal generator 15. In the figure, broken line block 16 indicates the operational mechanism or unit of the autopilot.

In the conventional autopilot system illustrated in FIG. 1 the integral circuit 2, the proportional circuit 3, the derivative circuit 4 and the filter circuit 5 are connected in parallel to one another as depicted. In this specification the following explanation will be given in connection with a system constructed as shown in FIG. 1. In practice, however, there are various other autopilots than that shown in FIG. 1, such as the types in which, for example, the proportional circuit 3, the derivative circuit 4 and the filter circuit 5 are incorporated in one block. Other arrangements provide the integral circuit 2, the proportional circuit 3, the derivative circuit 4 and the filter circuit 5 in one block. In other types the compass 13 is a gyro-compass which has incorporated therein a tachometer and a derivative signal is derived from the tachometer. In other systems the integral circuit 2 and the derivative circuit 3 are inserted in the feedback loop of the rudder angle. The present invention is applicable to all of these kinds of autopilots without requiring any modification.

In the case where the vehicle is, for example, a ship, the response of the ship to the rudder operation usually takes the form of first order approximation and the turning angular velocity $\dot{\phi}$ of the ship in accordance with the rudder angle $\delta$ is expressed $$(\dot{\phi}/\delta) = (K/TS + 1) \tag{1}$$

in the form of a transfer function, as is well-known. The turning angular velocity $\dot\phi$ of the ship is integrated by the compass mounted thereon and is detected in the form of the ship's heading signal $\phi$, as previously described in connection with FIG. 1. Accordingly, the transfer function of the ship including the compass is given by $$(\phi/\delta) = [K/S\,(TS + 1)] \quad (2)$$

In the equations 1 and 2 $K$ and $T$ are constants peculiar to a ship and referred to as maneuverability indices of the ship, which represent the steering performance of the ship. $S$ is Laplace's operator.

Figure 2:
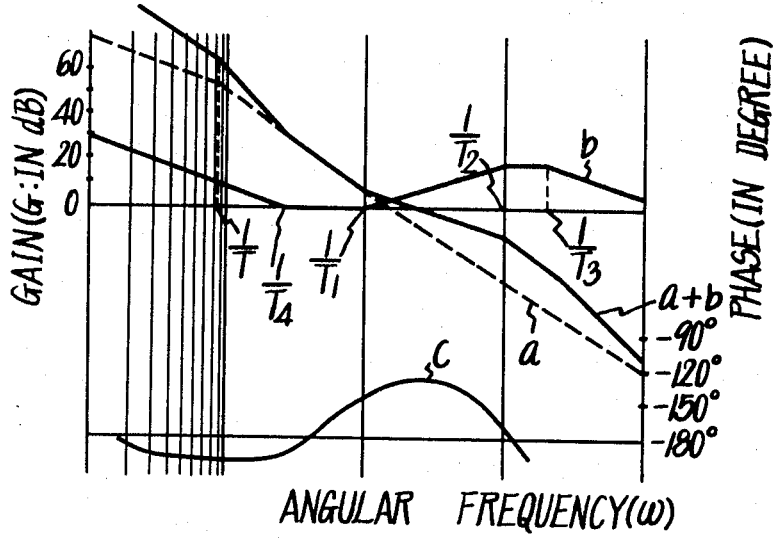
FIGS. 2-4 are its Bode diagrams.
Figure 3:
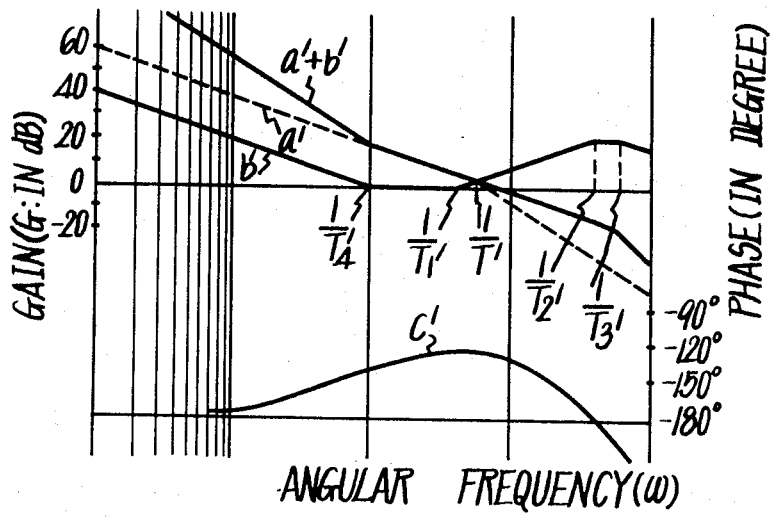

FIGS. 2 and 3 are well-known Bode diagrams for analyzing the characteristics of automatic control wherein the abscissa represents an angular frequency $\omega$ in logarithmic scale, the ordinate gain G in decibel scale and phase plotted in degrees. In FIG. 2 a dotted line curve $a$ is a Bode diagram of the transfer function of a ship No. 1 (a super tanker). A curve $b$ is a Bode diagram of an autopilot system having proportional, integral and derivative control abilities. Reference character $T_1$ indicates the so-called derivative time for providing a phase advance so as to stabilize the automatic steering system and $T_2$ and $T_3$ are time constants of the filter circuit 5, which suppresses or lowers the gain for phase compensation at $T_1$ so that it may not continue to increase in a high angular frequency range and thus prevent response of the power unit and the steering gear of the autopilot from being too sensitive to an external disturbance. Such external disturbance comprises yawing of the ship caused by winds, waves and so on. Abuse of the steering gear is unavoidable if it is attempted to steer the ship in response to the frequency of every external disturbance because this frequency is so high that the ship's hull cannot respond to each steering. Thus steering with such a frequency is useless and unnecessary. Thus, in this invention the time constants $T_2$ and $T_3$ are used to filter the peak of the derivative action and thereby ensure only effective steering.

A compensation circuit which performs the action indicated by the curve $b$ in FIG. 2 by incorporating the integral action into the automatic steering loop, has a characteristic with an integral time constant $T_4$. The gain of the autopilot is 1 (zero decibel) in FIG. 2. The gain curve $a + b$ and the phase curve $c$ show a Bode diagram of a loop transfer function of the automatic steering loop consisting of the ship and the autopilot. As indicated by the phase curve $c$, sufficient phase margin is obtained. This is a compensation value at which stables automatic steering is achieved (the steering gear is omitted for the sake of brevity).

FIG. 3 is a Bode diagram, similar to FIG. 2, which is of a ship No. 2 (a cargo boat) smaller than the ship No. 1. A dotted line $a'$ is a gain curve in a Bode diagram of the transfer function of the ship No. 2 and a curve $b'$ that of its autopilot. A curve $a' + b'$ is a gain curve in a Bode diagram of a loop transfer function of the automatic steering loop consisting of the autopilot and the ship. The phase margin of the loop transfer function is sufficient as indicated by a curve $c'$ in the figure, as is the case with the ship No. 1.

Figure 4:
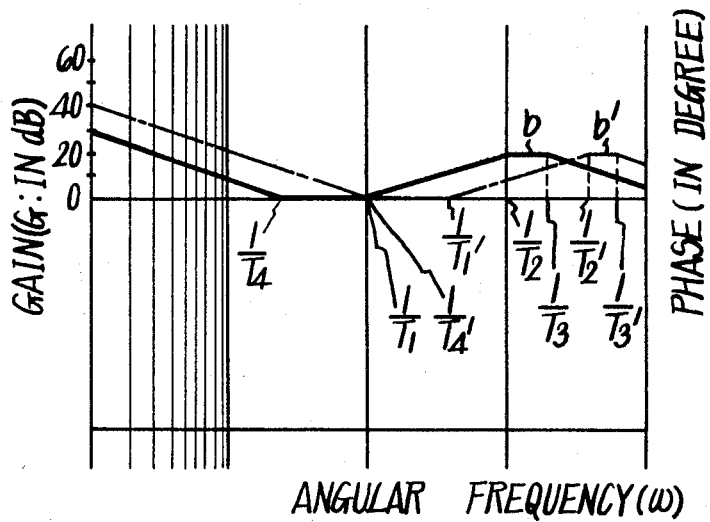

For carrying out the operations to obtain the curves of FIGS. 2 and 3, two filters with the time constants $T_2$ and $T_3$ are used to provide for enhanced filtering effect but there are some occasions when only one filter with the time constant $T_2$ is used. At other times three filters are employed, one of which is used for a higher frequency. For comparison of FIGS. 2 and 3, the curves $b$ and $b'$ therein are depicted in FIG. 4. As will be readily seen from FIG. 4, when the curve $b$ is shifted parallel to the abscissa, it coincides with the curve $b'$ and the same is true the relationship between the time constants $T_4$, $T_1$, $T_2$, $T_3$ and $T_4'$, $T_1'$, $T_2'$, $T_3'$, respectively. It will be understood that when the factors or constants K and T of the transfer function of the ship to be controlled are altered, the autopilot can be adjusted for stable control of the ship by correspondingly changing the time constants of the operational unit of the autopilot. Optimum adjustment of the time constants $T_1$, $T_2$, $T_3$ and $T_4$ as shown in FIG. 2 can be made. In order to obtain optimum adjustment of the autopilot for the medium-sized cargo boat No. 2, it is necessary to reduce the derivative time constant $T_1$ down to $T_1'$ because the response time constant T of the ship is reduced to T' in the cargo boat. With the reduction of the derivative time constant $T_1$, the frequency band for the compensation of phase advance of the control system shifts to a higher frequency band, so that the integral time $T_4$ which produces phase lag is shifted to a higher frequency value and the time constant $T_4$ is reduced to $T_4'$ which does not exert any bad effect upon phase compensation. That is, the smaller the integral time constant $T_4'$ is, the more rapidly the integral effect appears. Therefore, it is preferred to decrease the integral time constant $T_4'$ to an extent such as not to disturb the stability of automatic control. In order to render the autopilot loop optimum in the case of an object to be controlled being limited to, for example, a ship, a certain constant relationship is required between the derivative and integral time constants serving as parameters for automatic control based upon the automatic control theory described above. Accordingly, if the autopilot system is designed such that the time constants $T_1$ and $T_4$ may simultaneously vary relative to each other, operation of the autopilot becomes much simplified. In order to prevent the time constants $T_1$ and $T_4$ from becoming too close to each other or that misadjustment such as $T_1 \geqq T_4$ which leads to unstability in the automatic control loop which places a ship in danger, it is desirable to change the time constants $T_1$ and $T_4$ correlatively in such a manner that they increase or decrease together. As a result of this, even if the derivative time is misadjusted, there is no danger that the auto-steering loop will be made unstable by the integral time constant which result in meandering yawing of the ship.

The curves $b$ and $b'$ in FIG. 4 bear the following relation to each other. The time constants $T_2$, $T_3$ and $T_2'$, $T_3'$ which serve as the filtering time constants for the aforementioned external disturbances also vary in a manner similar to that of the derivative and integral time constants $T_1$ and $T_4$. The response time constant T of the ship to external disturbance shifts to a lower value in accordance with the length and width of the ship. Accordingly, when the ship is large it does not respond to a rudder displacement of a short duration and hence the steering is quite useless. This shows that economical automatic steering can be achieved by increasing or decreasing the time constants $T_2$ and $T_3$ such that T of the transfer function of the ship is expressed by the equation 1.

To sum up, the inclusion of the integral time constant $T_4$ which can be varied simultaneously in the same direction as that of the derivative time constant $T_1$ necessary for stabilizing the automatic steering, allows the adjustment of the autopilot system on the ship to be easily accomplished. Further, adjustment of the autopilot system is positively achieved by the operator by changing the filter time constants $T_2$ and $T_3$ correlatively with $T_1$. This results in an autopilot system in which safety and reliability are assured, greatly simplifies its adjustment, avoids its misadjustment and facilitates adjustment in the easiest manner.

Figure 5:
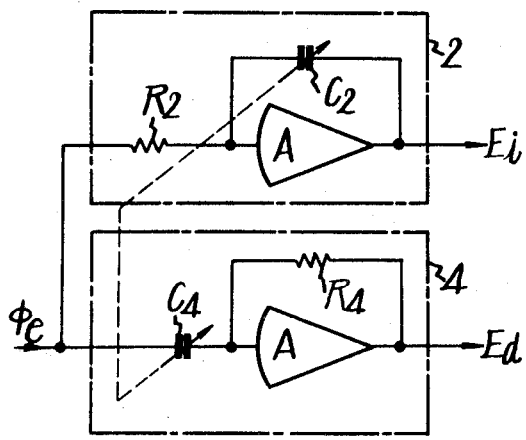
Figure 6:
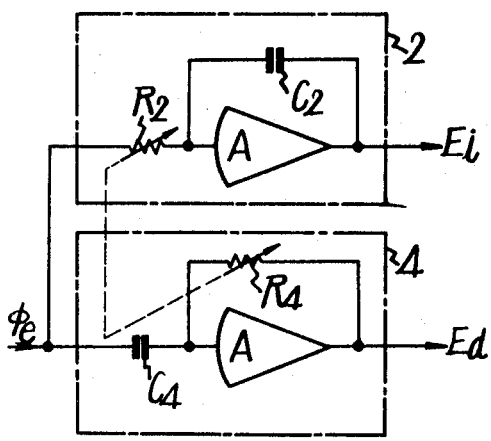

FIGS. 5 and 6 illustrate examples of this invention embodying the above-described effect, in which the derivative and integral circuits 4 and 2 include operational amplifier A. In the figures, reference numerals and characters corresponding to those in FIG. 1 identify elements similar to those in the latter.

In FIG. 5 the integral time constant of the integral circuit 2 is determined by an input resistor $R_2$ and a feedback capacitor $C_2$ of the operational amplifier A. If the gain of the operational amplifier A is infinite, an integral signal $E_i$ is given by the following equation.

$$E_i = -\frac{1}{R_2 C_2} \int \phi_o dt = -\frac{1}{T_4} \cdot \frac{\phi e}{S} \quad (3)$$

Similarly, a derivative signal $E_d$ derived from the derivative circuit 4 is expressed as follows:

$$E_d = -R_4 \cdot C_4 (d\phi_e/d_t) = -T_1 \phi_e S \quad (4)$$

Therefore, the time constants $T_4$ and $T_1$ can be changed by altering the capacity of each of the capacitors $C_2$ and $C_4$ of the integral and derivative circuits 2 and 4. In FIG. 5 the capacitors $C_2$ and $C_4$ are ganged together so they may be simultaneously adjusted.

Also in FIG. 6, the time constants $T_4$ and $T_1$ of the integrator circuit 2 and the derivative circuit 4 are changed together. The above change is effected by changing the values of resistors $R_2$ and $R_4$ which are ganged together.

As depicted in FIGS. 5 and 6, the time constants $T_1$ and $T_4$ are varied in the same direction correlatively with each other and this eliminates the possibility of their misadjustment, and hence prevents the automatic control loop from becoming unstable which would expose the ship to danger.

Fig. 7 illustrates another example of this invention in which parameters for the proportional, integral and derivative (PID) functions may be simultaneously adjusted and the filtering time constants may be simultaneously changed correlatively to thereby embody the theory of this invention. In FIG. 7, reference numerals and characters corresponding to those in FIG. 1 designate the same elements. In FIG. 1 the proportional, integral and derivative actions are respectively achieved by the separate parallel circuits and their outputs are added together. In the example of FIG. 7, however, the block 4' performs the proportional, derivative and filtering functions. The block 4' comprises an operational amplifier $A_2$, a feedback capacitor $C_5$, a feedback resistor $R_3$ of the operational amplifier $A_2$ and an input circuit for the operational amplifier $A_2$ which is made up of a resistor $R_1$, a capacitor $C_1$ and a variable resistor $VR_3$. A selected resistance value of the variable resistor $VR_3$ is shown as $R_2$. Reference numeral $VR_2$ indicates a potentiometer for dividing the input voltage and, the free end of its slider is connected to the capacitor $C_1$. Reference character $VR_4$ designates a potentiometer which divides the voltage of the output $e_2$ of the amplifier $A_2$ and supplies it to the feedback capacitor $C_5$. If the voltage dividing ratios of the potentiometers $VR_2$ and $VR_4$ are taken as $\beta$ and $\gamma$, the output $e_2$ is given by the following equation.

$$e_2 = -\left[\frac{R_3}{R_1}\left(\frac{\beta R_1 C_1 S}{R_2 C_1 S + 1} + 1\right)\frac{1}{\gamma \cdot R_3 C_2 S + 1}\right]\phi_o$$
$$= -\left[K_p\left(\frac{T_1 S}{T_2 S + 1} + 1\right)\frac{1}{T_3 S + 1}\right]\phi_o \quad (5)$$

From the above equation (5), the derivative time $T_1$ and the filtering time constants $T_2$ and $T_3$ are expressed as follows:

$$T_1 = \beta R_1 C_1, \quad T_2 = R_2 C_1, \quad T_3 = \gamma R_3 C_2$$

Therefore, $T_1$, $T_3$ and $T_2$ can be changed by adjusting the potentiometers $VR_2$, and $VR_4$ and the variable resistor $VR_3$. Further, a potentiometer $VR_1$ is provided in the integral circuit 2 and the error signal $\phi e$ is supplied to the operational amplifier $A_1$ through the potentiometer $VR_1$ and a resistor $R_4$. Reference character $C_2$ indicates a feedback capacitor of the amplifier $A_1$. If the voltage dividing ratio of the potentiometer $VR_1$ is taken as $\alpha$, the output $e_1$ of the amplifier $A_1$ is given by the following equation (6).

$$e_1 = \left[\frac{1}{\frac{1}{\alpha} R_4 C_2 S}\right]\phi_o = -\left[\frac{1}{T_4 S}\right]\phi_o \quad (6)$$

From the above equation the integral time $T_4$ is $(1/\alpha) R_4 C_2$, and the time constant $T_4$ can be changed by adjusting the potentiometer $VR_1$.

Consequently, in the structure of FIG. 7, the adjustment of $T_1$, $T_2$, $T_3$ and $T_4$ by changing the potentiometers $VR_1$, $VR_2$ and $VR_4$ and the variable resistor $VR_3$ in ganged relationship gives the advantages of the invention.

Although the example of FIG. 7 employs potentiometers and a variable resistor, it will be seen that they may be replaced with fixed resistors of different resistance values which are changed by switches for adjusting them to the desired values.

The adder 6 is made up of input resistors $R_5$ and $R_6$ and a feedback resistor $R_7$ of an operational amplifier $A_3$ and is supplied with the outputs $e_1$ and $e_2$ from the integral circuit 2 and the block 4'.

In the example of FIG. 7 $T_1$, $T_2$, $T_3$ and $T_4$ are all correlative to one another but in an autopilot system which has no integral circuit 2 it is sufficient to correlate only $T_1$, $T_2$ and $T_3$.

Also in the example of FIG. 7, it is a matter of course to correlate only $T_1$ and $T_4$ as in the examples of FIGS. 5 and 6 for simplifying the adjustment.

It will be apparent that many modifications and variations may be effected without departing from the scope of the novel concepts of this invention.

We claim as our invention:

1. A marine autopilot system comprising a means for derivative action, a means for proportional action, means for integral action, a means for producing a filtering effect, and a means for changing together an integral time constant for the integral action and at least either one of a derivative time constant for the derivative action and a filtering time constant for the filtering effect in a certain correlative relation to each other in a manner not to render an automatic steering loop unstable, thereby to control a ship safely, wherein the last-mentioned means consists of a first operational amplifier, an integral circuit connected thereto and including a first electric element determining the integral time constant, a second operational amplifier, and a derivative circuit connected thereto and including a second electric element determining the derivative time constant, the first and second electric elements being changed correlatively.

2. A marine autopilot system comprising a means for derivative action, a means for proportional action, means for integral action, a means for producing a filtering effect, and a means for changing together an integral time constant for the integral action and at least either one of a derivative time constant for the derivative action and a filtering time constant for the filtering effect in a certain correlative relation to each other in a manner not to render an automatic steering loop unstable, thereby to control a ship safely, wherein the last-mentioned means consists of an integral circuit including an operational amplifier, a feedback capacitor therefor and an input resistor therefore, and a derivative circuit including an operational amplifier, a feedback resistor therefore and an input capacitor therefor, the values of the feedback capacitor and the input capacitor being changed in association with each other.

3. A marine autopilot system comprising a means for derivative action, a means for proportional action, means for integral action, a means for producing a filtering effect, and a means for changing together an integral time constant for the integral action and at least either one of a derivative time constant for the derivative action and a filtering time constant for the filtering effect in a certain correlative relation to each other in a manner not to render an automatic steering loop unstable, thereby to control a ship safely, wherein the last-mentioned means consists of an integral circuit including an operational amplifier, a feedback capacitor therefor and an input resistor therefor, and a derivative circuit including an operational amplifier, a feedback resistor and an input capacitor, the values of the input resistor and the feedback resistor being changed in association with each other.

4. A marine autopilot system comprising a means for derivative action, a means for proportional action, means for integral action, a means for producing a filtering effect, and a means for changing together an integral time constant for the integral action and at least either one of a derivative time constant for the derivative action and a filtering time constant for the filtering effect in a certain correlative relation to each other in a manner not to render an automatic steering loop unstable, thereby to control a ship safely, wherein the last-mentioned means consists of an integral circuit including a first operational amplifier and a first electric element connected thereto for determining the integral time constant, a derivative circuit including a second operational amplifier and a second electric element connected thereto for determining the derivative time constant, and a circuit including a third electric element connected to the first or second operational amplifier for determining the time constant of the filter effect, the values of the first, second and third electric elements being changed in association with one another.

5. A marine autopilot system as claimed in claim 4 wherein the first and second electric elements are potentiometers and the third element is made up of a variable resistor and a potentiometer.

* * * * *